United States Patent [19]

Smith

[11] Patent Number: 4,623,132
[45] Date of Patent: Nov. 18, 1986

[54] GAS SPRING COUNTERBALANCE SYSTEM

[75] Inventor: Lawther O. Smith, Doylestown, Pa.

[73] Assignee: Fichtel & Sachs Industries, Inc., Colmar, Pa.

[21] Appl. No.: 706,158

[22] Filed: Feb. 27, 1985

[51] Int. Cl.⁴ ............................................. F16F 9/54
[52] U.S. Cl. ...................................... 267/34; 16/289; 16/306; 267/120; 267/121
[58] Field of Search ............. 267/8 R, 8 B, 34, 64.11, 267/120, 121; 16/66, 67, 70, 84, 85, 289, 290, 306, DIG. 10, DIG. 40, DIG. 41; 188/321.11

[56] References Cited

U.S. PATENT DOCUMENTS

| 3,207,498 | 9/1965 | Wustenhagen et al. | 267/64.11 |
| 3,831,919 | 8/1974 | Nicholls | 267/34 |
| 3,977,712 | 8/1976 | Northrop | 16/84 X |
| 4,245,826 | 1/1981 | Wirges | 267/121 X |
| 4,380,847 | 4/1983 | Tajima | 16/85 |

FOREIGN PATENT DOCUMENTS

| 2036247 | 6/1980 | United Kingdom | 16/66 |
| 56-49436 | 5/1981 | Japan | 267/64.11 |
| 311079 | 5/1929 | United Kingdom | |

Primary Examiner—George E. A. Halvosa
Assistant Examiner—Richard R. Diefendorf
Attorney, Agent, or Firm—Brumbaugh, Graves, Donohue & Raymond

[57] ABSTRACT

A gas spring-assisted counterbalance system for a closure member, e.g., the rear door of a hatchback automobile, includes a mechanical spring connected in series with a gas spring. The system is arranged so that the gas spring reaches its fully retracted position before the door is fully closed, after which the door is closed against the force of the mechanical spring. Longitudinal vibrations or short movements of the system which otherwise would impart undesired short stroke cycles to the gas spring are absorbed by the mechanical spring, thereby enhancing the operating lifetime of the gas spring.

5 Claims, 2 Drawing Figures

GAS SPRING COUNTERBALANCE SYSTEM

BACKGROUND OF THE INVENTION

1. Field of the Invention

The present invention relates generally to gas spring-assisted counterbalance systems, and more particularly to a counterbalance system of that type in which a supplemental mechanical spring is connected in series with the gas spring to isolate the gas spring unit from recurrent short cycles due to system vibrations or the like.

2. The Prior Art

Gas springs of the generic type disclosed in U.S. Pat. No. 3,207,498 have found wide acceptance in many industries as convenient and efficient devices for pneumatically counterbalancing loads such as the weight of doors, windows and other closure members during opening and/or closing movements. This is especially true in the automobile industry, where gas springs have been widely used as counterbalance devices for trunk decks, hatchback doors and windows, engine compartment covers, and so forth.

Although gas springs function well in such applications, they remain functional only so long as the integrity of the high pressure gas seal and bearing assembly is maintained. Such seal and bearing assemblies have a finite lifetime, however, and are susceptible to premature failure if subjected to undue cycling (longitudinal movement of the piston rod relative to the seal and bearing assembly) of the gas spring. This situation has been found to exist in certain automotive installations, for example, where road-induced vibrations result in undesirable numerous short cycles of the gas spring. In another example, manufacturers of hatchback models sometimes provide for the hatchback to open slightly to relieve air pressure within the car when a passenger door is closed, thus permitting easy closing of the door. As a consequence, the gas spring or springs attached to the hatchback are cycled every time a passenger door is used, with the result that the rated cycle lifetime of the gas springs will be exceeded much sooner than would otherwise occur.

While it is known to isolate fluid dampers and gas springs with elastomeric bushings at the attachment points, this technique is not satisfactory for the aforementioned applications. Such bushings add an additional spring effect in series with the gas spring, which additional spring effect is always present and can lead to undesirable bounce in the overall spring system in the extended position. Further, the displacement of the elastic bushings is too small to accommodate other system variables such as manufacturing and assembly tolerances, overtravel requirements, etc., which affect the distance between the gas spring attachment points in the retracted position of the gas spring.

As will be appreciated, therefore, a need exists in the art for a gas spring-assisted counterbalance system which isolates the gas spring component from undesirable, recurrent short cycles that impair the useful lifetime of the spring. The present invention fulfills this and other requirements of the prior art.

SUMMARY OF THE INVENTION

In accordance with the invention, a gas spring counterbalance system includes a supporting frame, a closure member hinged to the frame for movement between opened and closed positions, a gas spring coupled between the closure member and the frame for assisting in moving the closure member to and/or from the opened position, and a supplemental mechanical spring unit interposed between at least one end of the gas spring and the closure member or frame. The gas spring is sized and arranged relative to the distance between the points of attachment thereof to the closure member and the frame so that its working stroke will be exhausted, i.e., the spring will be fully retracted, before the closure member reaches the closed position. The closure member is then moved to the closed position against the resilient force of the supplemental spring unit. In this way, any short cycles or vibrations within the overall spring system will be absorbed by the supplemental spring unit and will not be transmitted to the piston rod and the surrounding high pressure seal and bearing assembly of the gas spring.

As a feature of the invention, provision is made on the gas spring, as for example by a stop member carried by the piston rod which abuts against the end of the cylinder, to define the fully retracted position of the gas spring and to transmit loads directly through the mechanical components of the gas spring independently of the pneumatic fluid. The stop member may, if desired, be made adjustable.

The supplemental mechanical spring unit preferably includes a helical compression spring, but may include or comprise any other suitable spring member or members as hereinafter described. The supplemental spring is preferably preloaded to a force equal to or slightly greater than the push-out force on the piston rod just before the gas spring reaches the fully retracted position. This will insure that the supplemental spring will be compressed to an intermediate deflection before the closure member is fully closed, thereby off-loading vibrational and other forces from the piston rod when the gas spring is in the retracted position. The preload will also provide solid support for the closure member when the gas spring is in the extended position. Additionally, the stroke of the supplemental spring is preferably sufficient, even when the spring is deflected as aforementioned, to accommodate short strokes of the counterbalance system, such as might result from overtravel requirements of the overall system plus any longitudinal vibrations imparted to the gas spring while in the retracted position.

In a preferred embodiment, the gas spring counterbalance system of the invention is employed in conjunction with the rear door of an automobile, e.g., a hatchback model, wherein the rear door is opened slightly to relieve internal air pressure whenever a passenger door is closed. The respective strokes of the gas spring and the supplemental spring unit are selected so that the gas spring will be fully retracted against a stop member and the supplemental mechanical spring will be intermediately compressed before the hatchback reaches the closed position. With this arrangement, the slight opening of the hatchback which occurs when a passenger door is operated will be absorbed by the supplemental spring and will not result in cycling of the gas spring, thereby lengthening the operating lifetime of the gas spring.

BRIEF DESCRIPTION OF THE DRAWING

Further advantages and features of the invention will be apparent from the following description of an illustrative embodiment, taken in conjunction with the accompanying drawing in which.

DESCRIPTION OF REPRESENTATIVE EMBODIMENT

For illustrative purposes, the invention is described hereinafter by reference to an embodiment thereof in a hatchback model automobile. It will be understood, however, that the invention is not so limited, but that it has application to counterbalance systems in general in which it is desirable to isolate a gas spring from conditions productive of short spring cycles that would reduce spring lifetime.

Figure 1:
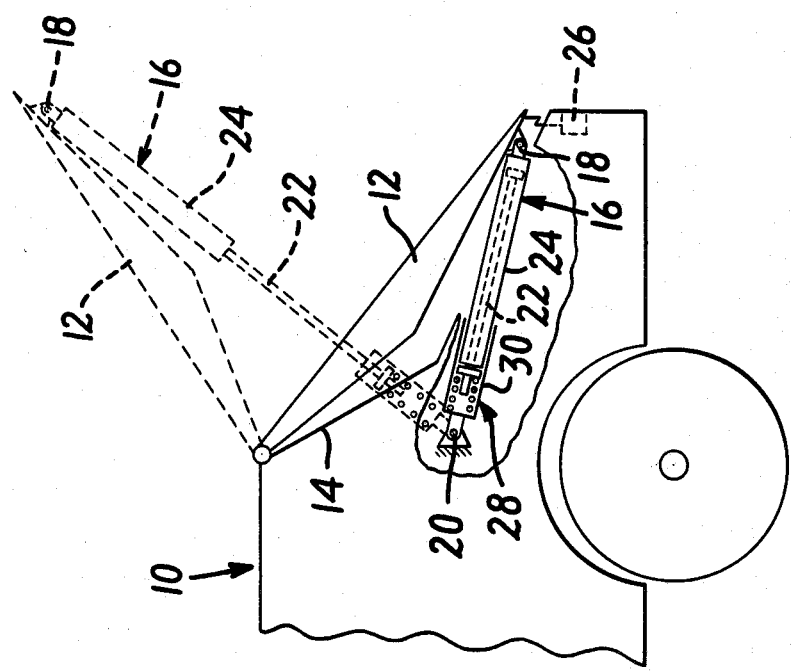
FIG. 1 is a schematic view of a gas spring installed according to the invention in a counterbalance system for the hatchback of an automobile so as to isolate the gas spring from undesired short cycles.

As shown in FIG. 1, a hatchback model automobile 10 includes a hatchback door 12 hinged at the top to the car body for movement between a lower, closed position relative to the door frame 14 and an upper, opened position illustrated in dashed lines. The car body is shown partially cut away to illustrate the manner of connection of a gas spring 16 between pivot points 18 and 20 on the door 12 and the body 10, respectively. As is conventional in such installations, the gas spring 16 is in the retracted position, i.e., the piston rod 22 is retracted within the cylinder 24, when the door 12 is closed and is extended, as shown in dashed lines, when the door 12 is opened.

The solid-line position of the door 12 as shown in FIG. 1 is a partially closed one in which the door is slightly ajar. This would be the position of the door, for example, if it were opened slightly to relieve air pressure when a passenger door is closed. Alternatively, the door 12 could have been moved from the upper dashed line position to the solid-line position by hand preparatory to fully closing the door. A conventional motor-driven latch mechanism 26 is shown for purposes of engaging a catch on the door when the door is in the partially closed position and thereafter automatically moving the door to the fully closed position without further operator intervention. Such an automatic power-operated latch mechanism is especially useful and convenient where the door 12 is released each time a passenger door is closed, and the present invention is particularly advantageous for systems that include such a device inasmuch as the short cycles that would be imposed on the gas spring 16 attendant to the operation of such a device are eliminated.

In accordance with the invention, the gas spring 16 is shown as having a supplemental mechanical spring unit 28 mounted at the rod end thereof and interposed between it and the pivot point 20 on the car body. The mechanical spring unit 28 as shown includes a helical spring 29, but it will be understood that other spring types, such as leaf, spiral, torsion bar, disk, elastomeric member or air cushion, for example, may be employed so long as the desired spring characteristics are provided, as described hereinafter. In alternative arrangements, the spring unit 28 might be provided at the cylinder end of the gas spring 16 or supplemental spring units may be provided at both ends.

Figure 2:
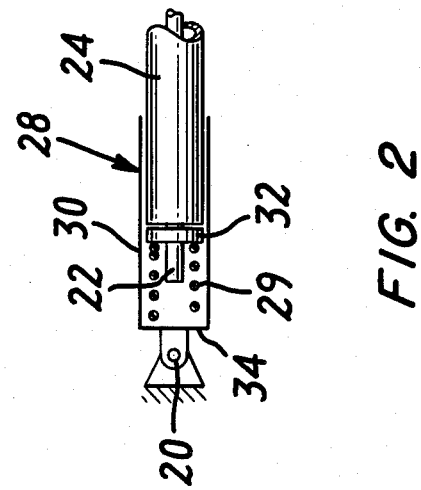
FIG. 2 is an enlarged detail view of the supplemental spring connected in series with the gas spring of FIG. 1.

As shown in more detail in FIG. 2, the mechanical spring unit 28 also includes a tubular member 30 which is slidably mounted over the outside of the cylinder 24. The member 30 is pivoted to the car body at 20 and transmits thereto any transverse loads applied to the counterbalance system. If a spring type other than a helical compression spring is employed, it may of course be desirable or necessary to connect the gas spring to the car body by some means other than the tubular member 30. For example, a leaf or spiral spring might simply connect directly to the car body, and a torsion bar might likewise connect directly or through an intermediate lever arm.

The helical spring 29 or other spring element is preferably preloaded to a force at least as great, and suitably slightly greater than, the push-out force exerted on the piston rod 22 by the gas spring when the gas spring is retracted to a position just prior to the fully retracted position. To that end, the spring 29 is captured between a mechanical stop 32 on the piston rod 22 and the end 34 of the tubular member 30 to maintain the desired preload on the spring 29. The stop 32 also functions to limit the travel of the piston rod 22 into the cylinder 24 by abutment with the end of the cylinder. This defines the fully retracted position of the gas spring, which is the position illustrated in full lines in FIGS. 1 and 2.

The stop 32 may be made adjustable along the rod 22, as for example by threads, to permit optimization of overall system performance, whether by adjustment of the amount of preload on the supplemental spring 29, the length of travel of the piston rod 22 within the cylinder 24, or both. Shims (not shown) may be inserted on one or both sides of the stop 32 for this purpose as well.

With the spring 29 preloaded as aforementioned, i.e., so as to exert a spring force equal to or slightly in excess of the push-out force of the gas spring 16 when the spring is nearly fully retracted, the spring 29 will be compressed to an intermediate deflection when the gas spring reaches the fully compressed position shown in the drawing. Since the mechanical stop 32 will then be in contact with the cylinder 24, any longitudinal vibrations or other forces exerted on the gas spring system will be off-loaded from the piston rod and the pneumatic fluid and will instead be absorbed by the mechanical spring unit 28. As will be understood, the spring 29 has a sufficient working stroke, even when intermediately deflected, to accommodate such longitudinal vibrations or other forces as well as the overtravel requirements of the spring system when the door 12 is moved to the closed position. The preferred preload on the spring 29 will also insure that the mechanical spring is not compressed until the gas spring is nearly fully retracted, thereby providing firm support for the door 12 in the extended position of the gas spring 16.

With this arrangement of the gas spring 16 and the mechanical spring unit 28 in series, not only will the mechanical spring unit absorb longitudinal vibrations which might otherwise put too many short cycles on the gas spring but it will also accommodate other short strokes of the counterbalance system, such as those resulting from the slight opening of the rear door 12 to relieve internal air pressure. Undue wear of the high pressure seal and bearing assembly of the gas spring is thereby avoided.

Although the invention has been described and illustrated herein with reference to a specific embodiment thereof, it will be understood that such embodiment is susceptible of modification and variation without departing from the inventive concepts disclosed. All such modifications and variations, therefore, are intended to be included within the spirit and scope of the appended claims.

I claim:

1. In a gas spring counterbalance system for a closure member held by a hinge to a support frame for movement between opened and closed positions relative to an opening in the support frame, said system including a gas spring enclosing a pneumatic fluid attached at one end to the closure member and at the other end to the support frame for assisting in moving said closure member about said hinge, the improvement comprising:

the working stroke of said gas spring relative to the distance between the points of attachment of the spring to the closure member and the support frame being such that the spring reaches its fully retracted position before the closure member reaches said closed position;

stop means carried by said gas spring for defining said fully retracted position and operative thereat for transmitting loads through said spring independently of the pneumatic fluid in said spring; and supplemental spring means mounted between at least one end of the gas spring and the point of attachment proximate said end, for resiliently permitting the closure member to be moved from the position at which said gas spring is fully retracted to said closed position and for thereafter resiliently isolating the gas spring from relative longitudinal movements between the gas spring and the lastmentioned attachment point when the closure member is in said closed position, and characterized in that said supplemental spring means is preloaded to a force equal to or slightly greater than the pushout force exerted by the gas spring at a position just prior to said fully retracted position, whereby said supplemental spring means is not further compressed until the gas spring approaches said fully retracted position and thereafter is compressed to an intermediate degree when said gas spring is in said fully retracted position.

2. The system of claim 1 wherein said supplemental spring means comprises a helical compression spring.

3. The system of claim 1 wherein the working stroke of said supplemental spring means is sufficiently long to absorb short strokes of the counterbalance system without transmitting said strokes to the gas spring.

4. The system of claim 1 wherein said system further includes power-operated latch means for moving the door from a partially closed position to said closed position, and wherein the improvement further comprises:

said gas spring being sized and arranged relative to said frame and said closure member such that the gas spring is in said fully retracted position when the door is at said partially closed position, and said power-operated latch means moves the closure member from the partially closed position to the fully closed position against the force of said supplemental spring means.

5. The system of claim 4 wherein said closure member comprises the rear door of an automobile.

* * * * *